(12) United States Patent
Fujii et al.

(10) Patent No.: US 8,167,693 B2
(45) Date of Patent: May 1, 2012

(54) OPERATION INPUT DEVICE, OPERATION EVALUATION METHOD, RECORDING MEDIUM, AND PROGRAM

(75) Inventors: Daisuke Fujii, Tokyo (JP); Takeshi Okubo, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1415 days.

(21) Appl. No.: 11/575,653

(22) PCT Filed: Sep. 12, 2005

(86) PCT No.: PCT/JP2005/016776
§ 371 (c)(1),
(2), (4) Date: Mar. 20, 2007

(87) PCT Pub. No.: WO2006/033258
PCT Pub. Date: Mar. 30, 2006

(65) Prior Publication Data
US 2008/0096623 A1    Apr. 24, 2008

(30) Foreign Application Priority Data
Sep. 22, 2004   (JP) ................................. 2004-275719

(51) Int. Cl.
*A63F 9/24* (2006.01)
*A63F 13/00* (2006.01)
*G06F 17/00* (2006.01)
*G06F 19/00* (2006.01)

(52) U.S. Cl. ............ 463/6; 340/953; 340/975; 340/961; 463/7; 463/23; 463/49; 345/690

(58) Field of Classification Search .................. None
See application file for complete search history.

(56) References Cited

U.S. PATENT DOCUMENTS
3,668,622 A * 6/1972 Gannett et al. ................ 340/953
(Continued)

FOREIGN PATENT DOCUMENTS
EP       1 029 569 A2   8/2000
(Continued)

OTHER PUBLICATIONS
International Search Report and Written Opinion PCT/JP2005/016776 dated Nov. 15, 2005, 4 pages.
(Continued)

*Primary Examiner* — Paul A D'Agostino
(74) *Attorney, Agent, or Firm* — Howard & Howard Attorneys PLLC

(57) ABSTRACT

A target information storage unit (203) stores information regarding a group of targets (target panels) which are dispersedly disposed on a virtual race course and which each have an objective speed set therefor. An operation input reception unit (201) receives an operation input for a moving object (racing car) to be run on the course. Then, a running condition managing unit (204) manages the running condition of the moving object based on this operation input. Meanwhile, a passage determination unit (206a) sequentially determines whether or not the moving object has passed on the course by contacting the respective targets, based on the managed running condition. Further, a speed comparison unit (206b) compares the speed of the moving object at the time of the passage and the objective speed of each target. Then, an evaluation unit (206) evaluates the operation input from a user based on the determination result and comparison result.

7 Claims, 11 Drawing Sheets

U.S. PATENT DOCUMENTS

| | | | | |
|---|---|---|---|---|
| 4,174,836 A | * | 11/1979 | Kearney | 463/49 |
| 4,878,054 A | * | 10/1989 | Reynaud | 340/975 |
| 5,185,606 A | * | 2/1993 | Verbaarschot et al. | 340/961 |
| 5,272,652 A | | 12/1993 | Rosenshein et al. | 703/8 |
| 6,120,375 A | * | 9/2000 | Takahashi | 463/7 |
| 6,977,666 B1 | * | 12/2005 | Hedrick | 345/690 |
| 7,674,167 B2 | * | 3/2010 | Ohta | 463/6 |
| 2003/0127557 A1 | * | 7/2003 | Anderson et al. | 244/1 R |
| 2003/0130031 A1 | * | 7/2003 | Yoshida et al. | 463/23 |
| 2004/0210847 A1 | * | 10/2004 | Berson et al. | 715/788 |
| 2005/0024237 A1 | * | 2/2005 | Gannett | 340/967 |

FOREIGN PATENT DOCUMENTS

| | | |
|---|---|---|
| JP | 11-114222 A | 4/1999 |
| JP | 2004-113325 A | 4/2004 |
| WO | WO 98/10847 A1 | 4/2004 |

OTHER PUBLICATIONS

Supplementary European Search Report for Application No. 05778566.9, PCT/JP2005016776, mailed Feb. 5, 2008, 5 pages total.

* cited by examiner

TARGET INFORMATION

| PANEL NUMBER | DISPOSING POSITION | OBJECTIVE SPEED | SIZE | RANGE OF TOLERANCE | ... |
|---|---|---|---|---|---|
| No. 1 | (x1, y1, z1) | 250 | LARGE | ±10 | ... |
| No. 2 | (x2, y2, z2) | 130 | MIDDLE | 0 | ... |
| No. 3 | (x3, y3, z3) | 100 | MIDDLE | −5 | ... |
| ⋮ | ⋮ | ⋮ | ⋮ | ⋮ | ⋮ |

FIG. 3

RUNNING CONDITIONS OF RACING CAR OPERATED BY USER

| CURRENT POSITION | RUNNING DIRECTION | CURRENT SPEED | STEERING ANGLE | ACCELERATING CONDITION | DECELERATING CONDITION | RIGHT TURNING CONDITION | LEFT TURNING CONDITION | ... |
|---|---|---|---|---|---|---|---|---|
| (x1, y1, z1) | (xa, yb, zc) | 250 | 0 | 10 | — | — | — | ... |

FIG. 4

OPERATION INPUT DEVICE, OPERATION EVALUATION METHOD, RECORDING MEDIUM, AND PROGRAM

TECHNICAL FIELD

The present invention relates to an operation input device, an operation evaluation method, a recording medium, and a program which are suitable for a user to learn race techniques efficiently while enjoying himself/herself.

BACKGROUND ART

Conventionally, game devices for business use and home use have been widely spread. With such a game device, for example, the user (player) can play a race game by a vehicle such as a car, etc.

In such a race game, for example, the user generally operates a controller or the like, and drives a virtual vehicle (an F1 machine, a stock car, or the like), which runs on a virtual race course, to a predetermined goal point, vying for the time taken (drive time) or vying with other virtual vehicles for earlier arrival.

Further, a technique for a race game device which enables even a user not experienced in game operations to play a race game with relatively simple operations, has also been disclosed (for example, see Patent Literature 1).
Patent Literature 1: Unexamined Japanese Patent Application KOKAI Publication No. H11-114222 (pp. 2-3, FIG. 1)

DISCLOSURE OF INVENTION

Problem to be Solved by the Invention

In such a race game, a practice mode is often prepared so that the user can learn basic operations, etc. of the virtual vehicle. For example, by playing a race of a very low challenge level, the user is enabled to get used to the game itself or learn basic operations.

However, even in a case where a user, who has acquired basic operations to some degree by playing the practice mode, advances to the normal mode to play, he/she might fall in a situation that he/she cannot obtain a remarkable progress in the drive time or cannot defeat other virtual vehicles with which he/she vies for earlier arrival. This is because the race of the normal mode requires race techniques closer to the reality (real competition) such as line taking and corner work on the course.

Therefore, the user plays many races in the normal mode to refine his/her race techniques. That is, the user plays while giving various tries at which line to take to run on the course, or when tuning at a corner, how fast to enter the corner and how fast to rise at the corner, etc.

Still, since such race techniques are learned by individually repeating trial and error, it is not such fun for users or much efficient, either.

Therefore, many users give up acquiring race techniques in the middle of the way, and quit playing the race game.

The present invention was made to solve such a problem, and an object of the present invention is to provide an operation input device, an operation evaluation method, a recording medium, and a program which enable a user to learn race techniques efficiently while having fun.

Means for Solving the Problem

An operation input device according to a first aspect of the present invention comprises a target information storage unit, an operation input reception unit, a moving condition managing unit, and an evaluation unit, which are configured as follows.

First, the target information storage unit stores information regarding a group of targets which are disposed at a plurality of positions in a virtual space and which each have an objective speed set therefor. Further, the operation input reception unit receives an operation input for a moving object to be moved in the virtual space.

Meanwhile, the moving condition managing unit manages a moving condition of the moving object based on the received operation input. Then, the evaluation unit evaluates the received operation input by sequentially comparing a current position and current speed of the moving object which are based on the managed moving condition with disposing positions and objective speeds of the respective targets stored.

For example, in a case where a moving object (a virtual racing car, etc.) is run on a predetermined circuit (a virtual race course, etc.), the respective targets (respective target panels, etc.) are disposed along a recommended running line on the course (a recommended line on the course along which running can be fast, etc.). Further, an objective speed recommended at each disposing position is set for each target.

Here, the operation input reception unit receives an operation input for the moving object from the user, and the moving condition managing unit manages the moving condition (running condition on the course) of the moving object. Then, the evaluation unit sequentially compares the current position and current speed of the moving object with the disposing positions and objective speeds of the respective targets to evaluate the received operation input. For example, the evaluation unit evaluates the operation input by determining whether or not the moving object has passed the targets by contacting them from the relationship between the current position and the disposing positions and by comparing the current speed at that time with the objective speeds to determine whether or not the speed of the moving object at the time of the passage is equal to (or within a predetermined range of tolerance of) the objective speeds.

That is, in order to improve the evaluation, the user operates the steering wheel such that the moving object contacts each target, and operates the accelerator or the brake such that the speed of the moving object at that time becomes equal to the objective speed of the target. Therefore, as the evaluation gets higher, it means that race techniques such as line taking and corner work on the course have been acquired.

As a result, the user can learn race techniques efficiently while having fun.

An operation input device according to a second aspect of the present invention comprises a target information storage unit, an operation input reception unit, a moving condition managing unit, a passage determination unit, a speed comparison unit, and an evaluation unit, which are configured as follows.

First, the target information storage unit stores information regarding a group of targets which are disposed dispersedly on a running path laid in a virtual space and which each have an objective speed set therefor. Further, the operation input reception unit receives an operation input for a moving object to be moved on the running path. Then, the moving condition managing unit manages a moving condition of the moving object based on the received operation input.

Meanwhile, the passage determination unit sequentially determines whether or not the moving object has passed on the running path by contacting the respective targets, based on the managed moving condition. Further, the speed comparison unit compares a speed of the moving object at a time of the determining and the objective speed of each target. Then, the evaluation unit evaluates the received operation input based on a determination result that is determined and a result of the comparing.

For example, the respective targets are disposed along a running line recommended on the course. Further, an objective speed that is recommended at each disposing position is set for each target.

Here, the operation input reception unit receives an operation input for the moving object from the user, and the moving condition managing unit manages the moving condition (running condition on the running path) of the moving object. Meanwhile, the passage determination unit determines a passage of the moving object with target contact, and the speed comparison unit compares the speed of the moving object at the time of the determination with the objective speed. Then, the evaluation unit evaluates the operation input based on the determination result and the comparison result.

That is, in order to improve the evaluation, the user operates the steering wheel such that the moving object contacts each target, and operates the accelerator or the brake such that the speed of the moving object at that time becomes equal to the objective speed of the target. Therefore, as the evaluation gets higher, it means that race techniques such as line taking and corner work on the course have been acquired.

As a result, the user can learn race techniques efficiently while having fun.

The operation input device described above further comprises a drawing unit which draws a view field image including the moving object and the respective targets, based on the managed moving condition, and a display unit which displays the drawn view field image, and when drawing a target that is positioned closest to the moving object, the drawing unit may change a shape of the target based on a relationship between the current speed of the moving object and the objective speed of the target.

In this case, the user can grasp, for example, the speed difference between the current speed of the moving object and the objective speed of the target, from the shape of the target drawn, on the way of running the moving object toward the next target.

The drawing unit may draw the target, which includes a portion which is to be displayed at different positions according to a speed difference between the current speed of the moving object and the objective speed of the target.

For example, taking a target that includes a horizontal bar as an example, the drawing unit draws the bar at a position higher than a standard position in a case where the current speed of the moving object exceeds the objective speed, and in contrast, draws the bar at a position lower than the standard position in a case where the current speed of the moving object is lower than the objective speed.

In this case, the user can grasp the speed difference between the current speed of the moving object and the objective speed of the target, from the position of the bar of the target drawn, on the way of running the moving object toward the next target.

An operation evaluation method according to a third aspect of the present invention is an operation evaluation method using a target information storage unit (which stores information regarding a group of targets which are disposed at a plurality of positions in a virtual space and which each have an objective speed set therefor), and comprises an operation input receiving step, a moving condition managing step, and an evaluating step, which are configured as follows.

First, at the operation input receiving step, an operation input for a moving object to be moved in the virtual space is received. Further, at the moving condition managing step, a moving condition of the moving object is managed based on the received operation input. Then, at the evaluating step, a current position and current speed of the moving object which are based on the managed moving condition are compared sequentially with disposing positions and objective speeds of the respective targets stored, and the received operation input is evaluated.

For example, in a case where the moving object is run on a predetermined race course, the respective targets are disposed along a recommended running line on the course. An objective speed that is recommended at each disposing position is set for each target.

Here, an operation input for the moving object from the user is received at the operation input receiving step, and the moving condition (running condition on the course) of the moving object is managed at the moving condition managing step. Then, at the evaluating step, the current position and current speed of the moving object are compared sequentially with the disposing positions and objective speeds of the respective targets to evaluate the received operation input. In order for the operation input to be evaluated, it is determined whether or not the moving object has passed the targets by contacting them from, for example, the relationship between the current position and the disposing positions, and the current speed at that time and the objective speeds are compared to determine whether or not the speed of the moving object at the time of the passage is equal to (or within a predetermined range of tolerance of) the objective speeds.

That is, in order to improve the evaluation, the user operates the steering wheel such that the moving object contacts each target, and operates the accelerator or the brake such that the speed of the moving object at that time becomes equal to the objective speed of the target. Therefore, as the evaluation gets higher, it means that race techniques such as line taking and corner work on the course have been acquired.

As a result, the user can learn race techniques efficiently while having fun.

A program according to a fourth aspect of the present invention is configured to control a computer (including a game device) to function as the above-described operation input device.

This program can be stored on a computer-readable information recording medium such as a compact disk, a flexible disk, a hard disk, a magneto optical disk, a digital video disk, a magnetic tape, a semiconductor memory, etc.

The above-described program can be distributed and sold via a computer communication network, independently from a computer on which the program is executed. Further, the above-described information recording medium can be distributed and sold independently from the computer.

EFFECT OF THE INVENTION

According to the present invention, a user can learn race techniques efficiently while having fun.

BRIEF DESCRIPTION OF DRAWINGS

[FIG. 3] It is an exemplary diagram showing an example of target information stored in a target information storage unit of the operation input device.

[FIG. 4] It is an exemplary diagram showing an example of information managed by a running condition managing unit of the operation input device.

Figure 1:
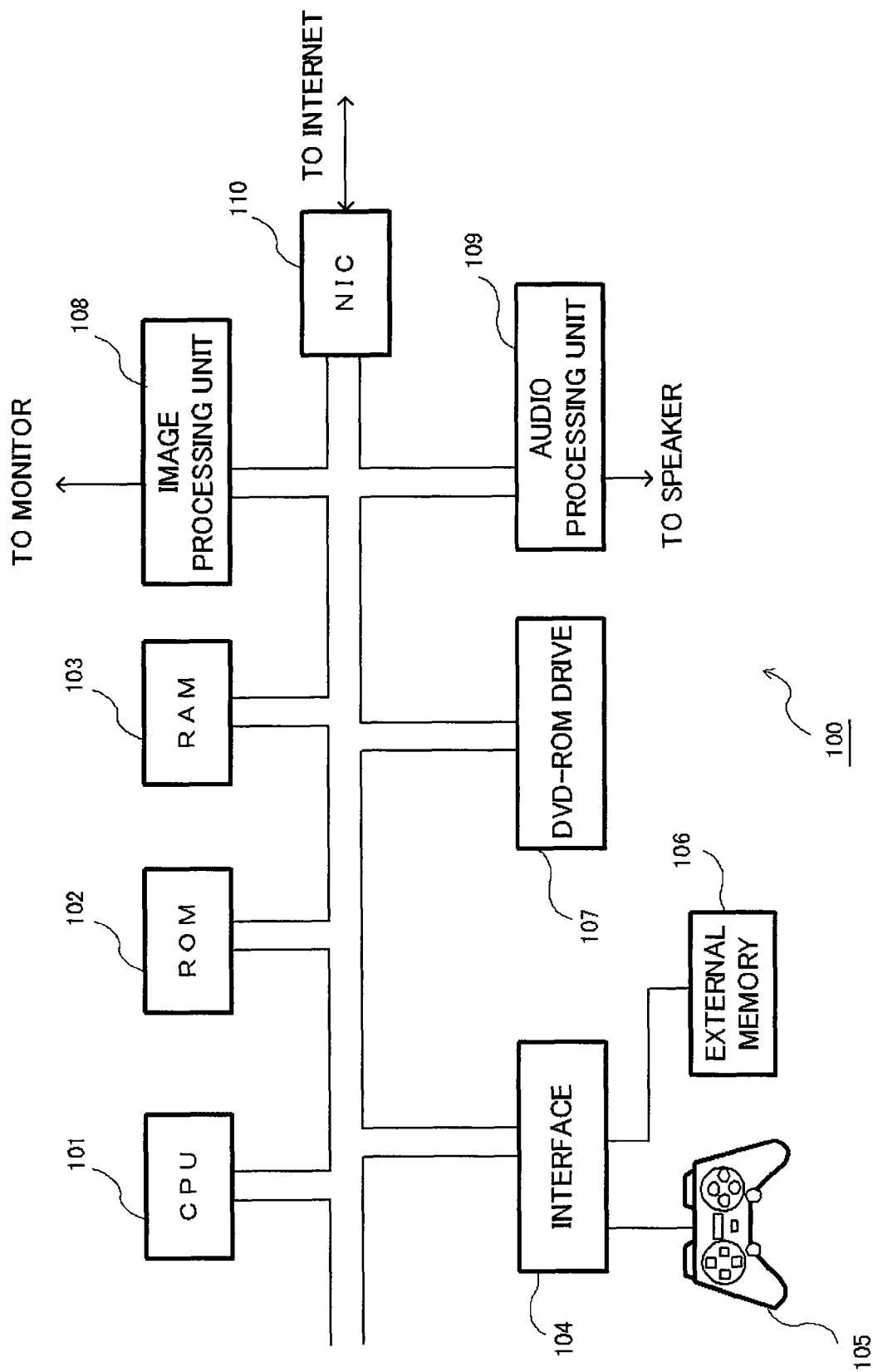
[FIG. 1] It is an exemplary diagram showing a schematic structure of a typical game device on which an operation input device according to an embodiment of the present invention will be realized.

EXPLANATION OF REFERENCE NUMERALS 100 game device
101 CPU
102 ROM
103 RAM
104 interface
105 controller
106 external memory
107 DVD-ROM drive
108 image processing unit
109 audio processing unit
110 NIC
200 operation input device
201 operation input reception unit
202 image information storage unit
203 target information storage unit
204 running condition managing unit
205 image creating unit
206 evaluation unit
206a passage determination unit
206b speed comparison unit
207 display control unit

BEST MODE FOR CARRYING OUT THE INVENTION

Embodiment 1

FIG. 1 is an exemplary diagram showing a schematic structure of a typical game device on which an operation input device according to an embodiment of the present invention will be realized. The following explanation will be given with reference to this diagram.

A game device 100 comprises a CPU (Central Processing Unit) 101, a ROM (Read Only Memory) 102, a RAM (Random Access Memory) 103, an interface 104, a controller 105, an external memory 106, a DVD (Digital Versatile Disk)-ROM drive 107, an image processing unit 108, an audio processing unit 109, and an NIC (Network Interface Card) 110.

By loading a DVD-ROM storing a game program and data onto the DVD-ROM drive 107 and turning on the power of the game device 100, the program will be executed and the operation input device according to the present embodiment will be realized.

The CPU 101 controls the operation of the entire game device 100, and is connected to each element to exchange control signals and data.

The ROM 102 stores an IPL (Initial Program Loader) to be executed immediately after the power is turned on, execution of which triggers the program stored on the DVD-ROM to be read into the RAM 103 and executed by the CPU 101. Further, the ROM 102 stores a program and various data for an operating system necessary for controlling the operation of the entire game device 100.

The RAM 103 is for temporarily storing data and programs, and retains the program and data read out from the DVD-ROM, and other data necessary for game proceedings and chat communications.

The controller 105 connected through the interface 104 receives an operation input given by the user when playing the game.

The external memory 106 detachably connected through the interface 104 rewritably stores data indicating the progress status of the game, data of chat communication logs (records), etc. The user can store these data on the external memory 106 where needed, by inputting instructions through the controller 105.

The DVD-ROM to be loaded on the DVD-ROM drive 107 stores a program for realizing the game and image data and audio data accompanying the game. Under the control of the CPU 101, the DVD-ROM drive 107 performs a reading process on the DVD-ROM loaded thereon to read out a necessary program and data, which are to be temporarily stored on the RAM 103, etc.

The image processing unit 108 processes the data read out from the DVD-ROM by means of the CPU 101 and an image calculation processor (unillustrated) provided in the image processing unit 108, and thereafter stores the data in a frame memory (unillustrated) provided in the image processing unit 108. The image information stored in the frame memory is converted into a video signal at a predetermined synchronization timing and output to a monitor (unillustrated) connected to the image processing unit 108. Thereby, image displays of various types are available.

Note that the image calculation processor can rapidly perform transparent operations such as overlay operation or a blending of two-dimensional images, and saturate operations of various types.

Further, the image calculation processor can also rapidly perform an operation for rendering, by a Z buffer method, polygon information placed in a virtual three-dimensional space and having various texture information added, to obtain a rendered image of the polygon placed in the virtual three-dimensional space as seen from a predetermined view position.

Further, by the CPU 101 and the image calculation processor working in cooperation, a character string as a two-dimensional image can be depicted on the frame memory, or depicted on the surface of each polygon, according to font information defining the shape of the characters. The font information is stored in the ROM 102, but specially-prepared font information stored on the DVD-ROM may be used.

The audio processing unit 109 converts audio data read out from the DVD-ROM into an analog audio signal, and outputs the signal from a speaker (unillustrated) connected thereto. Further, under the control of the CPU 101, the audio processing unit 109 generates sound effects and music data to be sounded in the course of the game, and outputs the sounds corresponding to the data from the speaker.

The NIC 110 is for connecting the game device 100 to a computer communication network (unillustrated) such as the Internet, etc., and comprises a 10BASE-T/100BASE-T product used for building a LAN (Local Area Network), an analog modem, an ISDN (Integrated Services Digital Network) modem, or an ADSL (Asymmetric Digital Subscriber Line) modem for connecting to the Internet by using a telephone line, a cable modem for connecting to the Internet by using a cable television line, or the like, and an interface (unillustrated) for intermediating between these and the CPU 101.

Aside from the above, the game device 100 may be configured to perform the same functions as the ROM 102, the RAM 103, the external memory 106, the DVD-ROM to be loaded on the DVD-ROM drive 107, etc. by using a large-capacity external storage device such as a hard disk, etc.

Further, it is also possible to employ an embodiment where a keyboard for accepting a character string editing input from the user, and a mouse for accepting various position designations and selection inputs from the user are connected.

Furthermore, a general computer (a general-purpose personal computer, etc.) may be used instead of the game device 100 of the present embodiment. For example, a general computer comprises a CPU, a RAM, a ROM, a DVD-ROM drive, and an NIC likewise the above-described game device 100, comprises an image processing unit having simpler functions than those of the game device 100, comprises a hard disk as an external storage device, and can also use a flexible disk, a magneto optical disk, a magnetic tape, etc. Further, such a general computer uses not a controller but a keyboard, a mouse, etc. as the input device.

(Schematic Structure of Operation Input Device)

Figure 2:
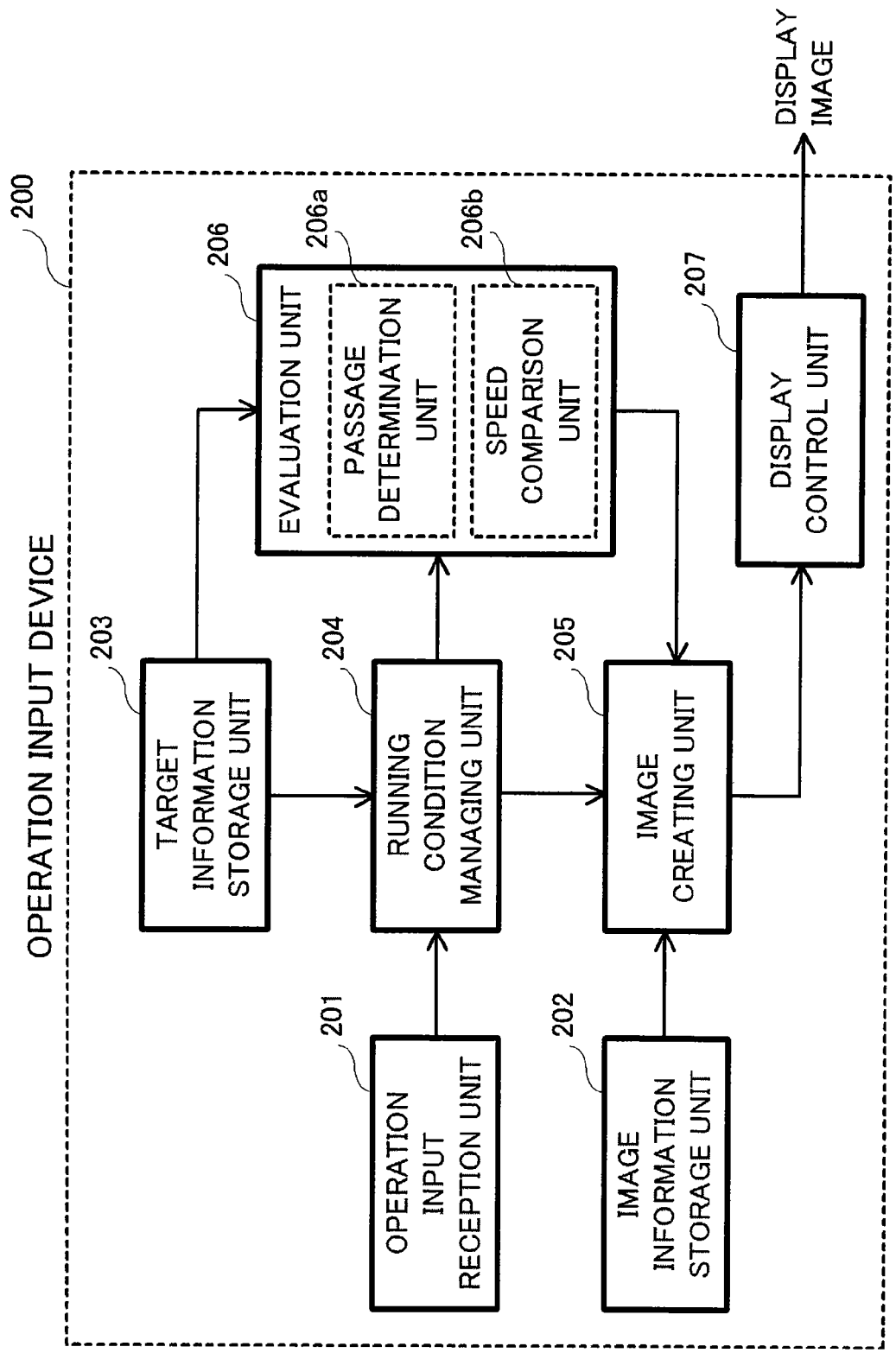
[FIG. 2] It is an exemplary diagram showing a schematic structure of an operation input device according to an embodiment of the present invention.

FIG. 2 is an exemplary diagram showing a schematic structure of the operation input device according to the present embodiment. The following explanation will be given with reference to this diagram.

The operation input device 200 comprises an operation input reception unit 201, an image information storage unit 202, a target information storage unit 203, a running condition managing unit 204, an image creating unit 205, an evaluation unit 206, and a display control unit 207.

The explanation will be given to a case that the operation input device 200 is applied to a racing game where a racing car is run on a circuit within a virtual space (on a virtual race course).

First, the operation input reception unit 201 receives an operation input for a racing car (virtual vehicle) which is to be run on the virtual course.

For example, the operation input reception unit 201 receives an operation input for a brake operation, an accelerator operation, a steering wheel operation, and a shifter operation, etc. necessary for running the racing car.

The controller 105 can function as the operation input reception unit 201.

The image information storage unit 202 stores image information of scenery images, etc. which include the course (running path) in the virtual space and image information of target panels, which are to be described later. Other than this, the image information storage unit 202 also stores image information including the racing car to be operated by the user.

The DVD-ROM loaded on the DVD-ROM drive 107, the external memory 106, etc. can function as such an image information storage unit 202.

The target information storage unit 203 stores information regarding target panels which are disposed dispersedly on the course. The target panels are the objective against which the user contacts (collides) the racing car when passing them, and a predetermined objective speed is set for each.

For example, the target information storage unit 203 stores target information as shown in FIG. 3. Specifically, the target information includes the disposing position, the objective speed, etc. of each target panel.

The disposing position of each target panel is a position along a running line recommended on the course (for example, a recommended line on the course along which running can be fast, etc.). Further, the objective speed of each target panel is a speed recommended at each disposing position.

The running condition managing unit 204 manages running conditions of the racing car operated by the user.

For example, the running condition managing unit 204 manages running conditions of the racing car operated by the user, by appropriately updating each information as shown in FIG. 4, according to operation information of various types sent from the operation input reception unit 201.

Other than this, the running condition managing unit 204 may manage running conditions of other racing cars (other cars), which run automatically. That is, the running condition managing unit 204 may likewise manage running conditions of other cars, by automatically updating the information on the other places (each information as shown in FIG. 4) according to predetermined logics and parameters instead of operation information.

The CPU 101 can function as such a running condition managing unit 204.

The image creating unit 205 creates an image (image in the proceeding direction) ahead of the racing car operated by the user, based on the image information stored in the image information storage unit 202 and the running conditions managed by the running condition managing unit 204. At this time, the image creating unit 205 refers to the above-described target information and disposes the target panels at corresponding positions.

Further, the image creating unit 205 also creates an image indicating the content of evaluation, etc. on an operation input from the user, based on a result of evaluation done by the evaluation unit 206.

Figure 5:
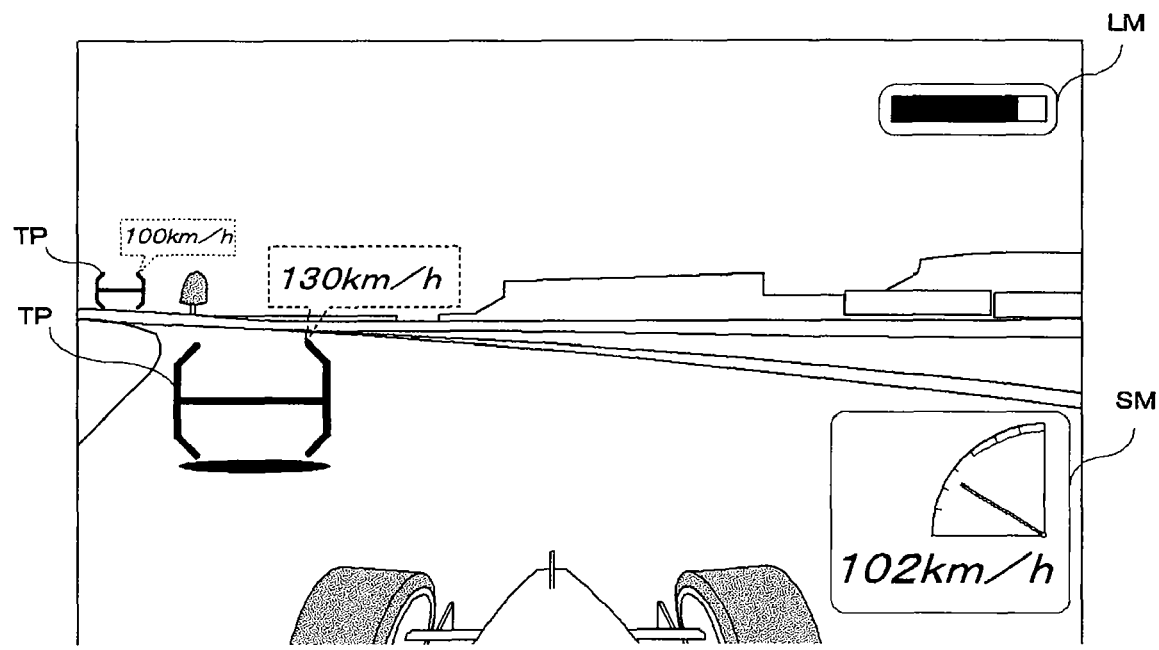
[FIG. 5] It is an exemplary diagram showing an example of a view field image drawn by an image creating unit of the operation input device.

Specifically, the image creating unit 205 draws a view field image (driver's view) as shown in FIG. 5, which is the forward view outside the car observed from the driver's seat of the racing car.

This view field image includes a plurality of target panels TP disposed on the course, with an objective speed (a set value) written near each target panel TP. Further, the view field image includes a speedometer SM for notifying the current speed of the racing car.

Furthermore, the view field image includes a life meter LM for notifying the evaluation content. For example, this life meter LM is drawn with its remaining amount reduced in a case where the evaluation by the evaluation unit 206 is bad (when a lowest evaluation is given, etc., as will be described later).

The image processing unit 108 can function as such an image creating unit 205.

The evaluation unit 206 acquires the current position and current speed of the racing car from the running condition managing unit 204, compares these current position and current speed sequentially with the disposing positions and objective speeds of the target panels stored in the target information storage unit 203 to evaluate operation inputs from the user received by the operation input reception unit 201.

To be more specific, the evaluation unit 206 comprises a passage determination unit 206a and a speed comparison unit 206b, and these in cooperation evaluate operation inputs from the user.

First, the passage determination unit 206a sequentially determines whether or not the racing car has passed the target panels on the course by contacting them. For example, the passage determination unit 206a determines any collision between the panel in question and the racing car, each time the racing car (current position) approaches each target panel (disposing position) in order as the racing car runs, in order to determine presence or absence of a contacting passage.

Next, in a case where the passage determination unit 206a determines that the racing car has passed the target panel by contacting it, the speed comparison unit 206b compares the speed of the racing car at the time of the determination (at the time of the contact) with the objective speed set for the panel. That is, the speed comparison unit 206b determines whether the speed of the racing car at the time of the contacting passage is equal to the objective speed of the target panel (or, within the range of tolerance).

Then, the evaluation unit 206 evaluates the operation input from the user received by the operation input reception unit 201, based on the determination result of the passage determination unit 206a and the comparison result of the speed comparison unit 206b.

Specifically, in a case where the racing car has passed the spot without contacting the target panel, the evaluation unit 206 gives an evaluation result of minus 10 points (lowest evaluation), as an example. Further, in a case where the speed of the racing car is not equal to the objective speed (or outside the range of tolerance) though the target panel has been contacted, the evaluation unit 206 gives an evaluation result of minus 5 points (middle evaluation), as an example. Meanwhile, in a case where the target panel has been contacted and also the speed of the racing car is equal to the objective speed (or within the range of tolerance), the evaluation unit 206 gives an evaluation result of plus 3 points (highest evaluation), as an example.

The CPU 101 can function as such an evaluation unit 206.

The display control unit 207 converts the image created by the image creating unit 205 into a predetermined image signal, and displays it on an external monitor or the like.

The image processing unit 108 can function as such a display control unit 207.

Figure 6:
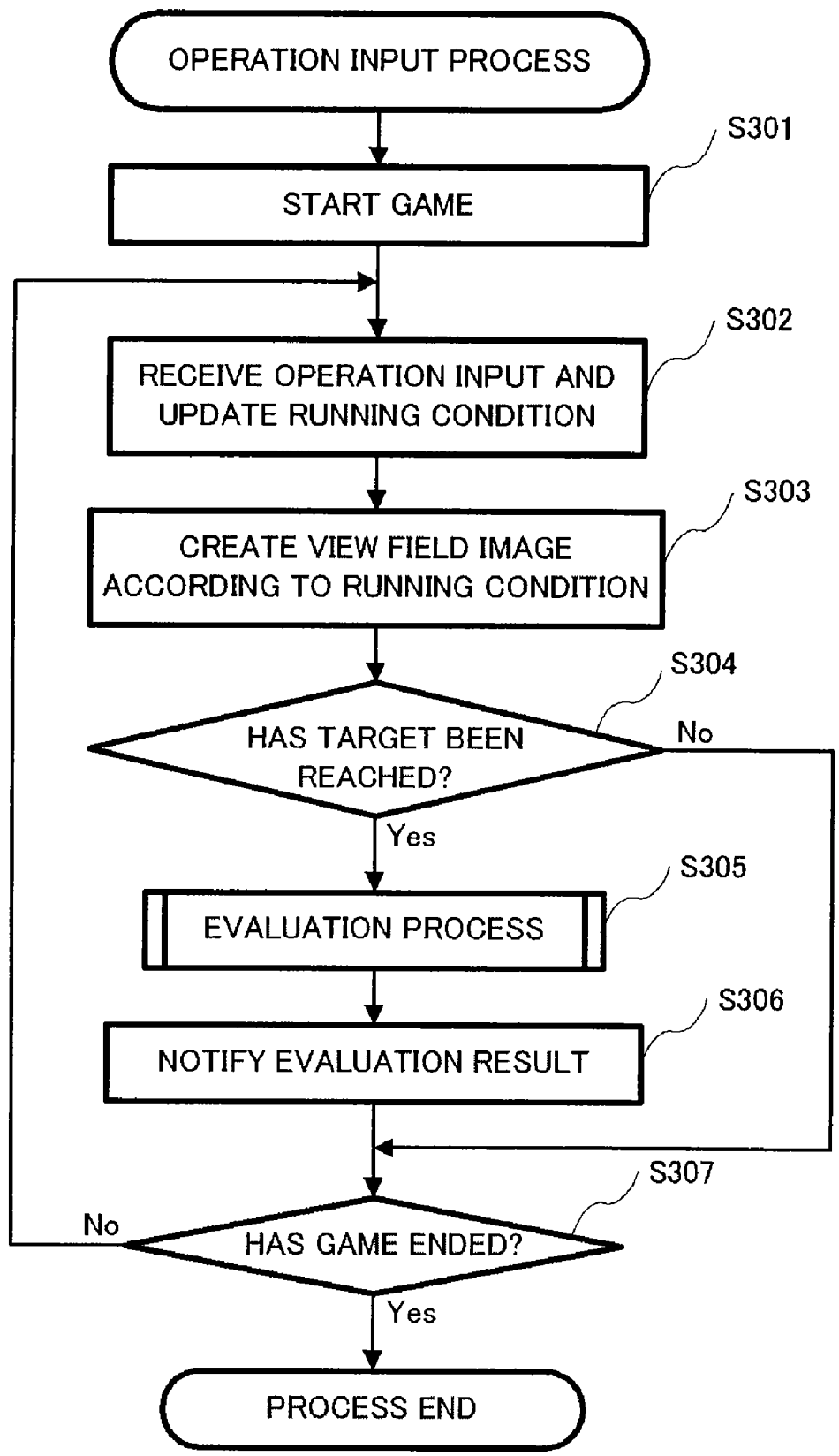
[FIG. 6] It is a flowchart showing a flow of an operation input process performed by the operation input device.
Figure 7:
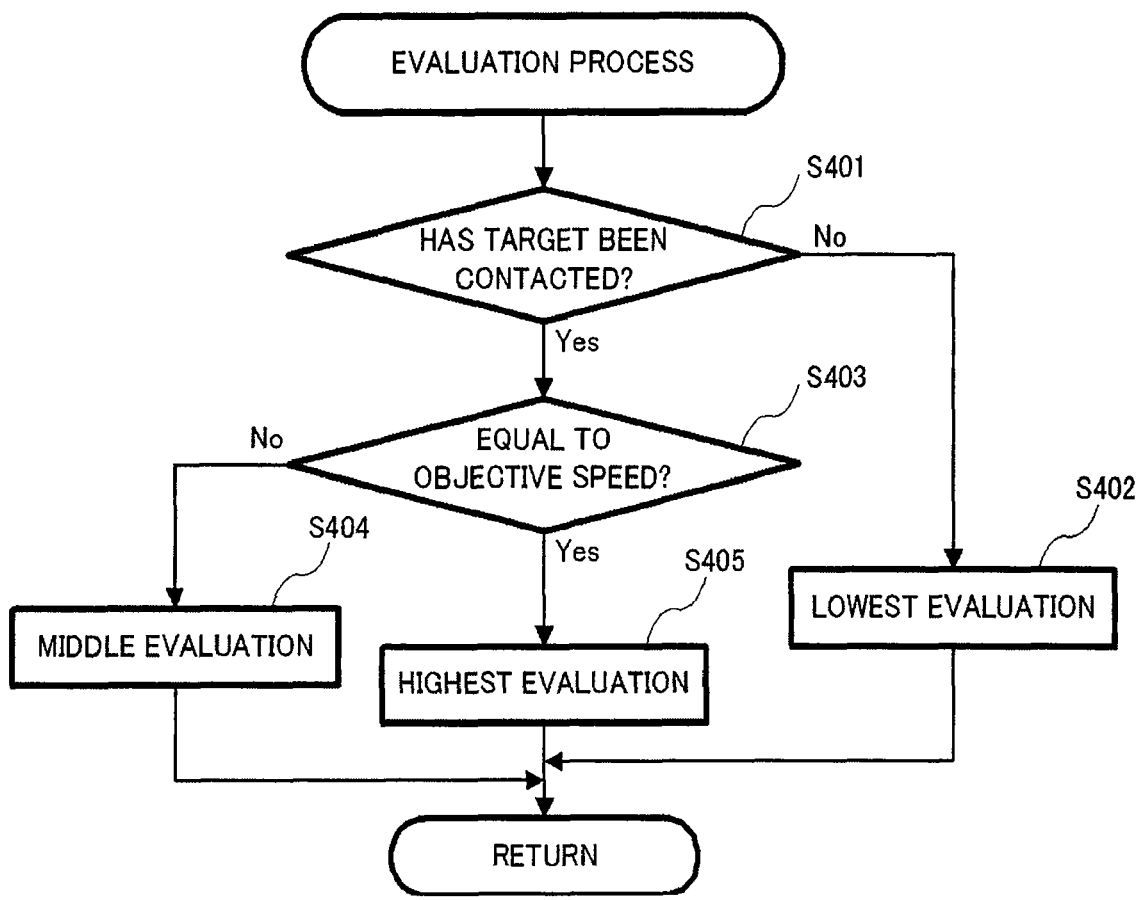
[FIG. 7] It is a flowchart showing a flow of an evaluation process (subroutine) performed by the operation input device.

FIG. 6 is a flowchart showing the flow of an operation input process performed by the operation input device 200. And FIG. 7 is a flowchart showing the flow of an evaluation process (subroutine). The following explanation will be given with reference to these diagrams. Note that the operation input process of FIG. 6 is started synchronously with the game proceeding when a car race game is played.

First, when the car race game is started (step S301), the operation input device 200 receives an operation input from the user and updates the running conditions of the racing car (step S302).

That is, when the operation input reception unit 201 receives an accelerator operation, a brake operation, a steering wheel operation, a shifter operation, etc., the running condition managing unit 204 updates the running conditions (current position, running direction, current speed, etc.) according to the operation.

The operation input device 200 creates a view field image according to the running conditions (step S303).

That is, the image creating unit 205 creates a view field image (driver's view) based on the image information stored in the image information storage unit 202 and the running conditions managed by the running condition managing unit 204. At this time, the image creating unit 205 refers to the target information stored in the target information storage unit 203 and disposes the target panels at the corresponding positions respectively.

Specifically, the image creating unit 205 creates a view field image as shown in FIG. 5 described above.

The operation input device 200 determines whether or not the racing car has reached the location at which a target panel is disposed (step S304).

That is, the passage determination unit 206a determines whether or not the current position of the racing car reaches the disposing position of the next target panel on the course.

Here, in a case where it is determined that the racing car has not reached the position of a target panel (the current position of the racing car is short of the disposing position of a target panel on the course), the operation input device 200 advances the process to step S307 described later.

On the other hand, in a case where it is determined that the racing car has reached a target panel, the operation input device 200 performs the evaluation process (step S305). That is, the operation input device 200 performs the evaluation process shown in FIG. 7.

In the evaluation process shown in FIG. 7, first, the operation input device 200 determines whether or not the racing car has contacted the target panel (step S401).

That is, the evaluation unit 206 determines a collision between the racing car and the panel.

Figure 8A:
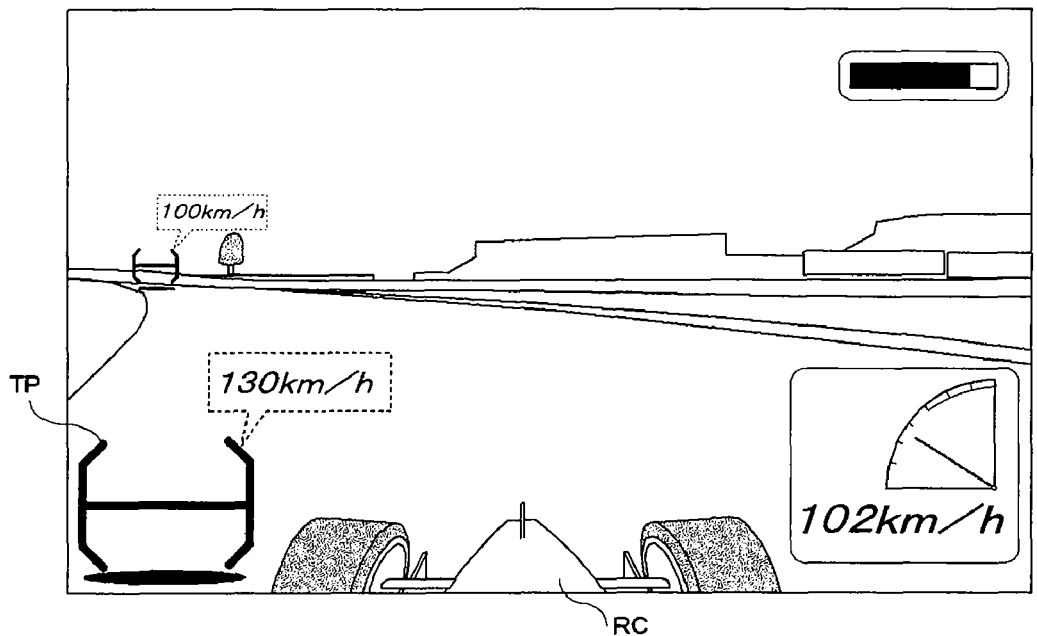
[FIG. 8A] It is an exemplary diagram for explaining the determination of a contact with a target panel.
Figure 8B:
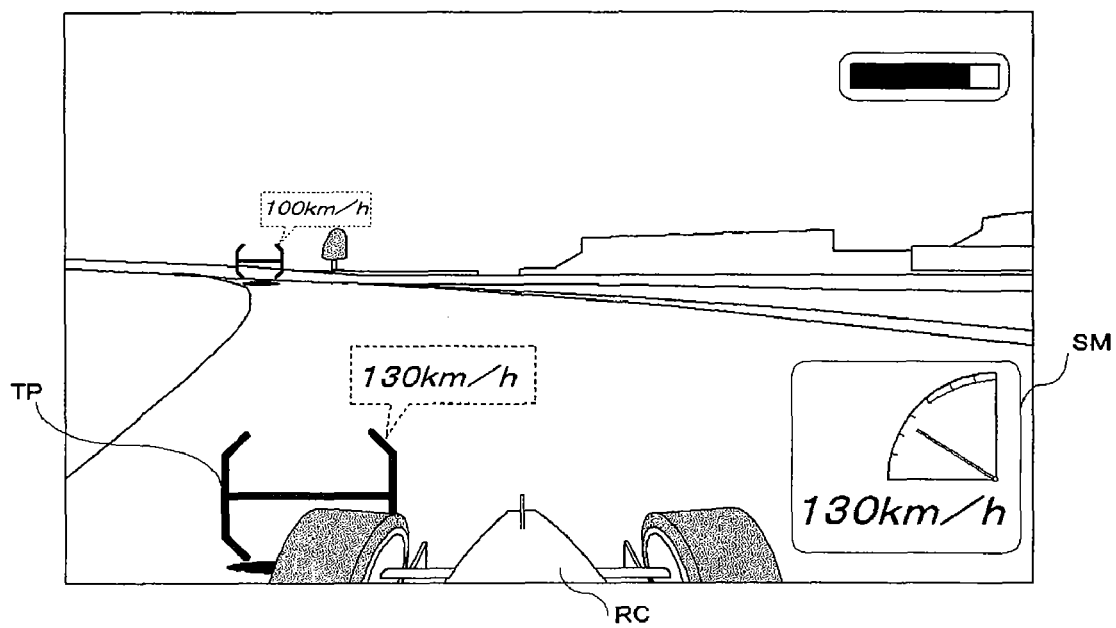
[FIG. 8B] It is an exemplary diagram for explaining the determination of a contact with a target panel.

Specifically, the passage determination unit 206a determines that the racing car has passed the panel without contacting it, in a case where the racing car RC dodges past the target panel TP as shown in FIG. 8A. Further, the passage determination unit 206a determines that the racing car has passed the panel by contacting it, in a case where the racing car RC positionally overlaps with the target panel TP as shown in FIG. 8B.

When it is determined that the racing car has not contacted the target panel, the operation input device 200 gives the lowest evaluation with the lowest score (step S402).

That is, since the racing car has passed the spot without contacting the target panel, the evaluation unit 206 gives, for example, an evaluation result of minus 10 points (lowest evaluation).

On the other hand, in a case where it is determined that the racing car has contacted the target panel, the operation input device 200 determines whether or not the current speed of the racing car coincides with the objective speed (or falls within the range of tolerance) (step S403).

That is, the evaluation unit 206 compares the speed of the racing car at the time of the contact and the objective speed set for the panel. Specifically, the speed comparison unit 206b determines whether the speed of the racing car managed by the running condition managing unit 204 coincides with (or falls within the range of tolerance of) the objective speed of the target panel in question stored in the target information storage unit 203.

To put it in easy words, the speed comparison unit 206*b* determines whether the speed on the speedometer SM shown in FIG. 8B is equal to (or within the range of tolerance of) the objective speed of the target panel TP.

When it is determined that the speed of the racing car does not coincide with the objective speed, the operation input device 200 gives a middle evaluation with a score, which is as low as the middle level (step S404).

That is, the evaluation unit 206 gives an evaluation result of, for example, minus 5 points (middle evaluation), as the speed of the racing car is not equal to the objective speed though the racing car has contacted the target panel.

On the other hand, in a case where it is determined that the speed of the racing car coincides with the objective speed, the operation input device 200 gives the highest evaluation with the highest score (step S405).

That is, the evaluation unit 206 gives an evaluation result of, for example, plus 3 points (highest evaluation), because the racing car has contacted the target panel and the speed of the racing car is equal to the objective speed (or within the range of tolerance).

Having given any evaluation, the operation input device 200 returns the process to the operation input process of FIG. 6.

Returning to FIG. 6, the operation input device 200 notifies the evaluation result (step S306).

That is, the image creating unit 205 notifies the evaluation result to the user, by drawing the life meter whose remaining amount is reduced, etc. Further, the image creating unit 205 may draw a message indicating the content of the evaluation.

Figure 9A:
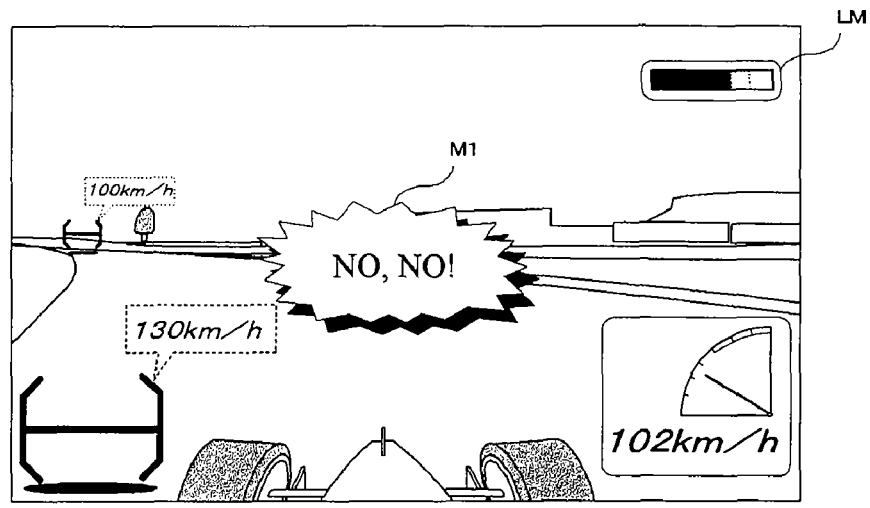
[FIG. 9A] It is an exemplary diagram showing an example of an evaluation content to be notified.

Specifically, in a case where the evaluation result is the lowest evaluation, the image creating unit 205 draws the life meter LM, whose remaining amount is largely reduced (for example, by an amount corresponding to minus 10 points), as shown in FIG. 9A. At this time, the image creating unit 205 may draw a message M1 indicating the content of the evaluation.

Figure 9B:
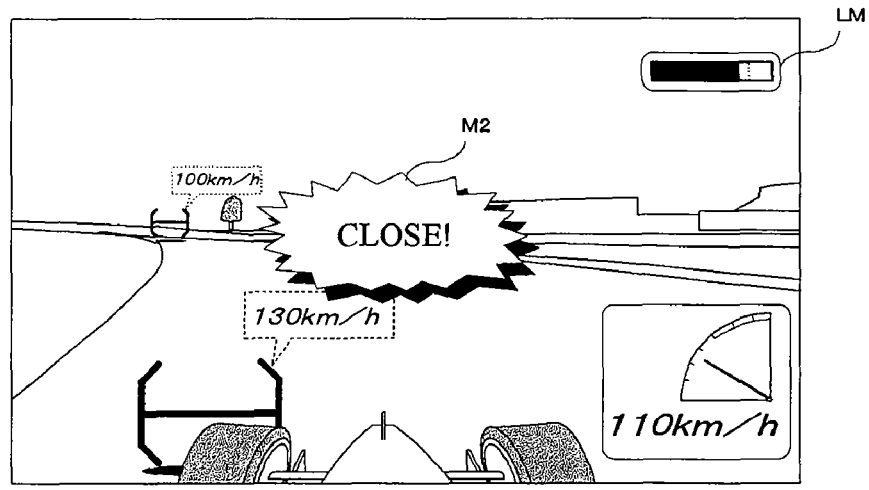
[FIG. 9B] It is an exemplary diagram showing an example of an evaluation content to be notified.

Further, in a case where the evaluation result is the middle evaluation, the image creating unit 205 draws the life meter LM, whose remaining amount is reduced to about the middle level (for example, by an amount corresponding to minus 5 points), as shown in FIG. 9B. At this time, the image creating unit 205 may draw an image M2 indicating the content of the evaluation.

Figure 9C:
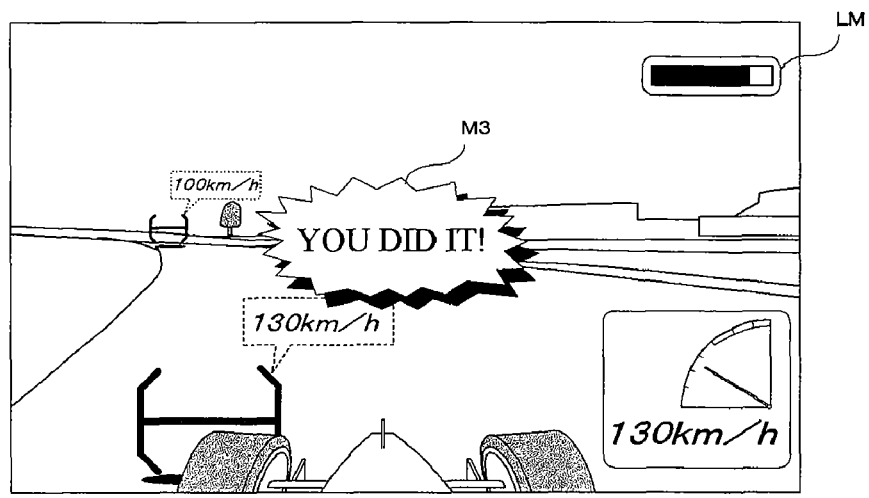
[FIG. 9C] It is an exemplary diagram showing an example of an evaluation content to be notified.

As compared with this, in a case where the evaluation result is the highest evaluation, the image creating unit 205 may draw a message M3 indicating the content of the evaluation, without reducing the remaining amount of the life meter LM, as shown in FIG. 9C. The image creating unit 205 may draw the life meter LM, whose remaining amount is increased by plus points (for example, 3 points).

Then, the operation input device 200 determines whether or not the game has ended (step S307).

In a case where it is determined that the game has not ended, the operation input device 200 returns the process to step S302 to repeatedly perform the above-described steps S302 to S307.

On the other hand, in a case where it is determined that the game has ended, the operation input device 200 terminates the operation input process.

As described above, according to the present embodiment, the operation input reception unit 201 receives an operation input for the racing car from the user, and the running condition managing unit 204 manages the running conditions of the racing car. Then, the evaluation unit 206 sequentially compares the current position and current speed of the racing car with the disposing positions and objective speeds of the target panels to evaluate the operation input received. That is, the evaluation unit 206 determines whether or not the racing car has passed a target panel by contacting it from the relationship between the current position and the disposing position, and determines whether or not the speed of the racing car at the time of passing is equal to the objective speed (or within the predetermined range of tolerance) by comparing the current speed at that time and the objective speed, thereby evaluating the operation input.

That is, in order to improve the evaluation, the user operates the steering wheel such that the racing car contacts each target panel, and operates the accelerator or the brake such that the speed of the racing car at that time becomes equal to the objective speed of the target panel. Therefore, as the evaluation gets higher, it means that the race techniques such as line taking and corner work on the course have been acquired.

As a result, the user can learn race techniques efficiently while having fun.

Another Embodiment

In the above-described embodiment, the target panel has been explained as having a shape as indicated by the target panel TP of FIG. 5, etc. described above, as an example. However, the shape of the target panel is not limited to such a shape, but arbitrary.

Further, in the above-described embodiment, a case has been explained that the target panel is displayed with its shape unchanged. However, the shape of the target panel may be changed so that the speed difference between the speed of the racing car and the objective speed can be expressed.

Figure 10A:
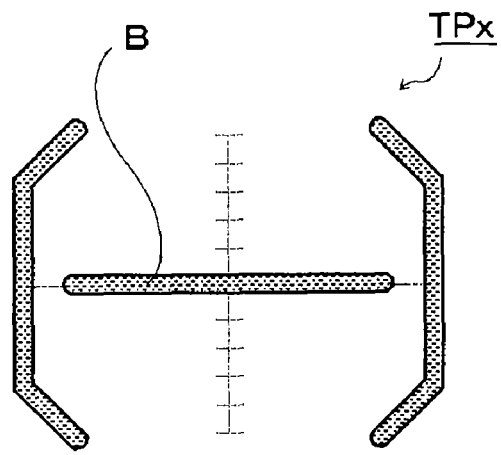
[FIG. 10A] It is an exemplary diagram for explaining an example of a target panel whose shape changes.

For example, the image creating unit 205 may draw a target panel TPx as shown in FIG. 10A, that has a horizontal bar B, when disposing the closest target panel that is ahead of the racing car (current position) in the running direction, on the running path. The horizontal bar B is changed in its position in the vertical direction (drawn at a different vertical position) according to the speed difference between the speed of the racing car and the objective speed of the panel.

Figure 10B:
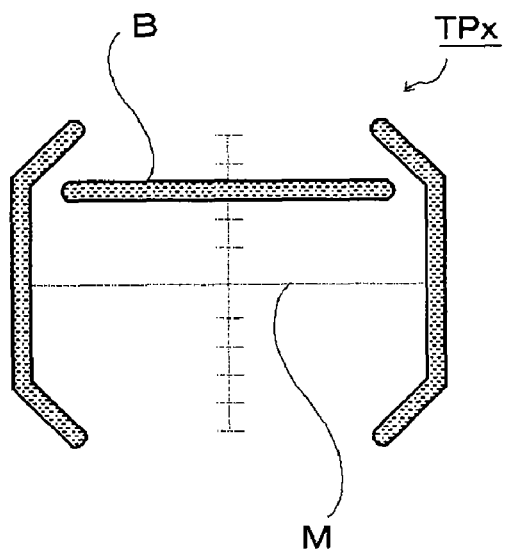
[FIG. 10B] It is an exemplary diagram for explaining an example of a target panel whose shape changes.
Figure 10C:
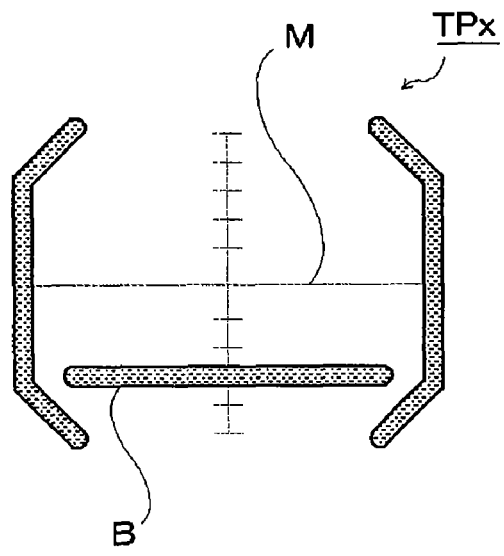
[FIG. 10C] It is an exemplary diagram for explaining an example of a target panel whose shape changes.

Specifically, with the middle position in the vertical direction set as the standard position of the horizontal bar, in a case where the speed of the racing car exceeds the objective speed of the panel, the horizontal bar B is drawn at a position higher than the standard position M, as shown in FIG. 10B. In contrast, in a case where the speed of the racing car does not reach the objective speed, the horizontal bar B is drawn at a position lower than the standard position M, as shown in FIG. 10C.

Note that the height gap between the standard position M and the horizontal bar B may be changed according to, for example, the speed difference between the speed of the racing car and the objective speed.

Figure 10D:
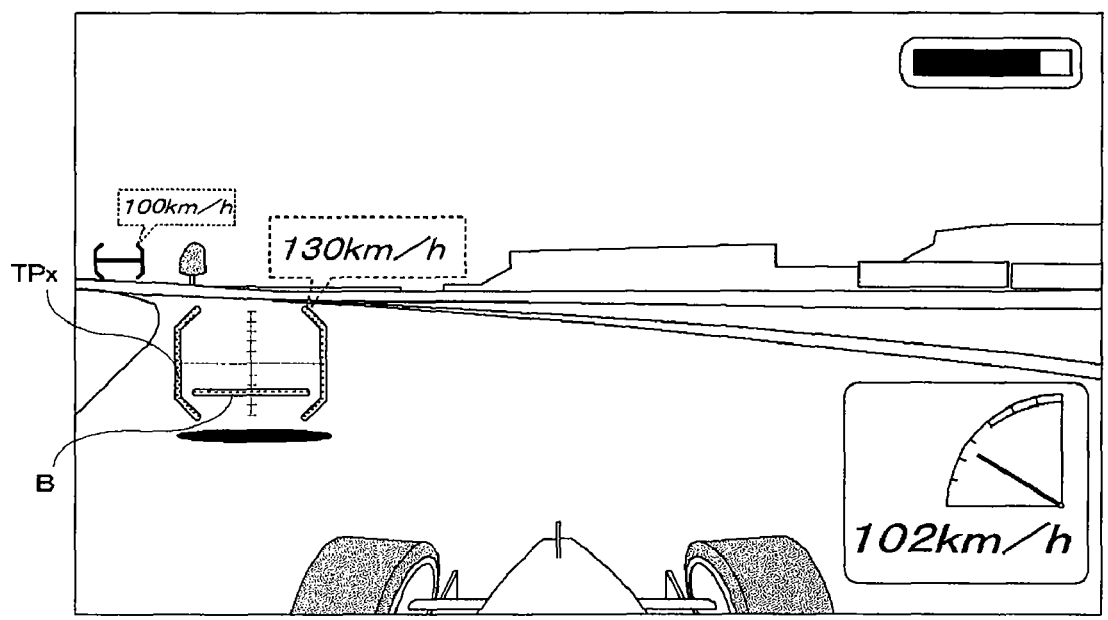
[FIG. 10D] It is an exemplary diagram showing an example of a view field image which includes a target panel whose shape changes.

Then, the image creating unit 205 draws such a target panel TPx in a view field image as shown in FIG. 10D. Thereby, the user can grasp the speed difference between the current speed of the racing car and the objective speed of the panel, from the position of the horizontal bar B in the drawn target panel TPx, on the way to the next target panel TPx, driving the racing car.

In the above-described embodiment, a case has been explained that only the target panels that are included (positioned) in the view field are displayed. However, also the target panels that are not included in the view field (target panels forward in the running direction) may be displayed as an advance notice for the user.

Figure 11:
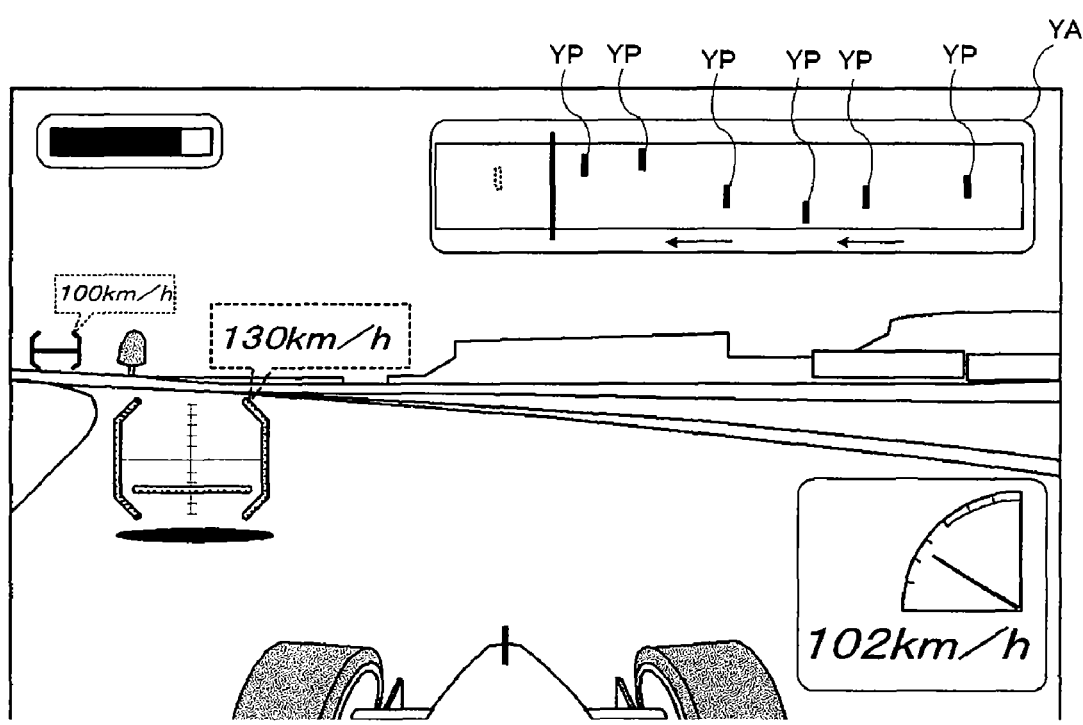
[FIG. 11] It is an exemplary diagram for explaining advance notice display.

For example, an advance notice display area YA is secured in the view field image as shown in FIG. 11, and advance notice panels YP, etc. are displayed in this area in a scrolling manner synchronous with the running of the racing car. That is, the image creating unit 205 re-lays the race course as a straight course and disposes the advance notice panels YP at corresponding positions on this straight course to display the advance notice panels YP, etc. in a horizontal scrolling manner, synchronously with the speed of the racing car.

Note that the advance display area YA may be formatted as a vertically-long rectangular area to display the advance notice panels YP in a vertical scrolling manner.

In this case, since the user can be notified in advance of the disposing positions of the target panels that are not included in the view field by this advance notice, the user can operate the racing car even on a course full of corners, etc. with a relaxed mind.

Further, in the above-described embodiment, the explanation has been given by employing a virtual vehicle (racing car) that runs in a virtual space as an example. However, the invention can be arbitrarily applied to any object (virtual moving object) that moves in a virtual space.

For example, in a case where the objective of operation is a virtual flying object (jet plane, passenger plane, etc.) that flies in a virtual space, target panels are disposed likewise along a flight course recommended for the virtual flying object. Then, by determining a contacting passage of the virtual flying object with a target panel and further comparing the speed at the time of the passage and the objective speed, it is likewise possible to evaluate the operation input of the user.

The present application claims priority based on Japanese Patent Application No 2004-275719, the content of which is incorporated herein in its entirety.

INDUSTRIAL APPLICABILITY

As explained above, according to the present invention, it is possible to provide an operation input device, an operation evaluation method, a recording medium, and a program which are suitable for a user to learn race techniques efficiently while having fun.

The invention claimed is:

1. An operation input device providing a game in which a moving object moves in a virtual space and targets are disposed in the virtual space, comprising:
   a target information storage unit which stores an each position of each of the targets and an each objective speed set for each of the targets;
   an operation input reception unit which receives an operation input;
   a moving condition managing unit which updates a current position, a current speed and a current direction of the moving object based on the received operation input;
   a passage determination unit which determines whether or not each of the targets collides against the moving object by referring to the current position of the moving object and the each stored position of each of the targets;
   a speed comparison unit which compares, when it is determined that one of the targets collides against the moving object, the current speed of the moving object to the stored objective speed set for the determined target which collides against the moving object;
   a drawing unit which draws a view field image depicting the virtual space observed from an observing point moving with the moving object and the targets in the virtual space, based on the current position of the moving object, the current direction of the moving object and the each stored position of each of the targets, the drawing unit drawing at least one of the targets with a graphical representation of the difference between the current speed and the respective objective speed of the at least one of the targets; and
   an evaluation unit which evaluates the received operation input based on a result of the determination and a result of the comparison and responsively generates a score, the drawing unit configured to draw a graphical representation of the score in real-time.

2. The operation input device according to claim 1, wherein:
   the moving object is a virtual racing car, and the targets are disposed dispersedly above a recommended running path laid on a course in the virtual space.

3. The operation input device according to claim 1, wherein the drawing unit selects, from among the targets, a target that is closest to the moving object and ahead of the moving object, and changes a shape of the selected target depicted in the view field image.

4. An operation evaluation method for providing a game in which a moving object moves in a virtual space and targets are disposed in the virtual space, the operation evaluation method using a target information storage unit storing an each position of each of the targets and an objective speed set for each of the targets, the operation evaluation method comprising:
   an operation input receiving step of receiving an operation input;
   a moving condition managing step of updating a current position, a current speed and a current direction of the moving object based on the received operation input; and
   a passage determination step of determining whether or not each of the targets collides against the moving object by referring to the current position of the moving object and the each stored position of each of the targets;
   a speed comparison step of comparing, when it is determined that one of the targets collides against the moving object, the current speed of the moving object to the stored objective speed set for the determined target which collides against the moving object;
   a drawing step of drawing a view field image depicting the virtual space observed from an observing point moving with the moving object and the targets in the virtual space, based on the current position of the moving object, the current direction of the moving object and the each stored position of each of the targets, at least one of the targets including a graphical representation of the difference between the current speed and the respective objective speed of the at least one of the targets;
   an evaluating step of evaluating the received operation input based on a result of the determination and a result of the comparison and responsively generating a score; and;
   drawing a graphical representation of the score in real-time on the view field image.

5. A non-transitory recording medium storing a program for providing a game in which a moving object moves in a virtual space and targets are disposed in the virtual space, the program controlling a computer to function as:
   a target information storage unit which stores an each position of each of the targets and an each objective speed set for each of the targets;
   an operation input reception unit which receives an operation input;

a moving condition managing unit which updates a current position, a current speed and a current direction of the moving object based on the received operation input;

a passage determination unit which determines whether or not each of the targets collides against the moving object by referring to the current position of the moving object and the each stored position of each of the targets;

a speed comparison unit which compares, when it is determined that one of the targets collides against the moving object, the current speed of the moving object to the stored objective speed set for the determined target which collides against the moving object;

a drawing unit which draws a view field image depicting the virtual space observed from an observing point moving with the moving object and the targets in the virtual space, based on the current position of the moving object, the current direction of the moving object and the each stored position of each of the targets, the drawing unit drawing at least one of the targets with a graphical representation of the difference between the current speed and the respective objective speed of the at least one of the targets; and an evaluation unit which evaluates the received operation input based on a result of the determination and a result of the comparison and responsively generates a score, the drawing unit configured to draw a graphical representation of the score in real-time.

6. A program stored in a non-transitory recording medium for providing a game in which a moving object moves in a virtual space and targets are disposed in the virtual space, the program controlling a computer to function as:

a target information storage unit which stores an each position of each of the targets and an each objective speed set for each of the targets;

an operation input reception unit which receives an operation input;

a moving condition managing unit which updates a current position, a current speed and a current direction of the moving object based on the received operation input;

a passage determination unit which determines whether or not each of the targets collides against the moving object by referring to the current position of the moving object and the each stored position of each of the targets;

a speed comparison unit which compares, when it is determined that one of the targets collides against the moving object, the current speed of the moving object to the stored objective speed set for the determined target which collides against the moving object;

a drawing unit which draws a view field image depicting the virtual space observed from an observing point moving with the moving object and the targets in the virtual space, based on the current position of the moving object, the current direction of the moving object and the each stored position of each of the targets, the drawing unit drawing at least one of the targets with a graphical representation of the difference between the current speed and the respective objective speed of the at least one of the targets; and an evaluation unit which evaluates the received operation input based on a result of the determination and a result of the comparison and responsively generates a score, the drawing unit configured to draw a graphical representation of the score in real-time.

7. The operation input device according to claim 3, wherein the drawing unit draws a first figure depicting the current speed of the moving object and a second figure depicting the objective speed set for the selected target, in the drawn shape of the selected target.

* * * * *